Nov. 11, 1941.  W. V. HOBBS ET AL  2,262,496
CONTROL APPARATUS
Filed April 13, 1939  2 Sheets-Sheet 1

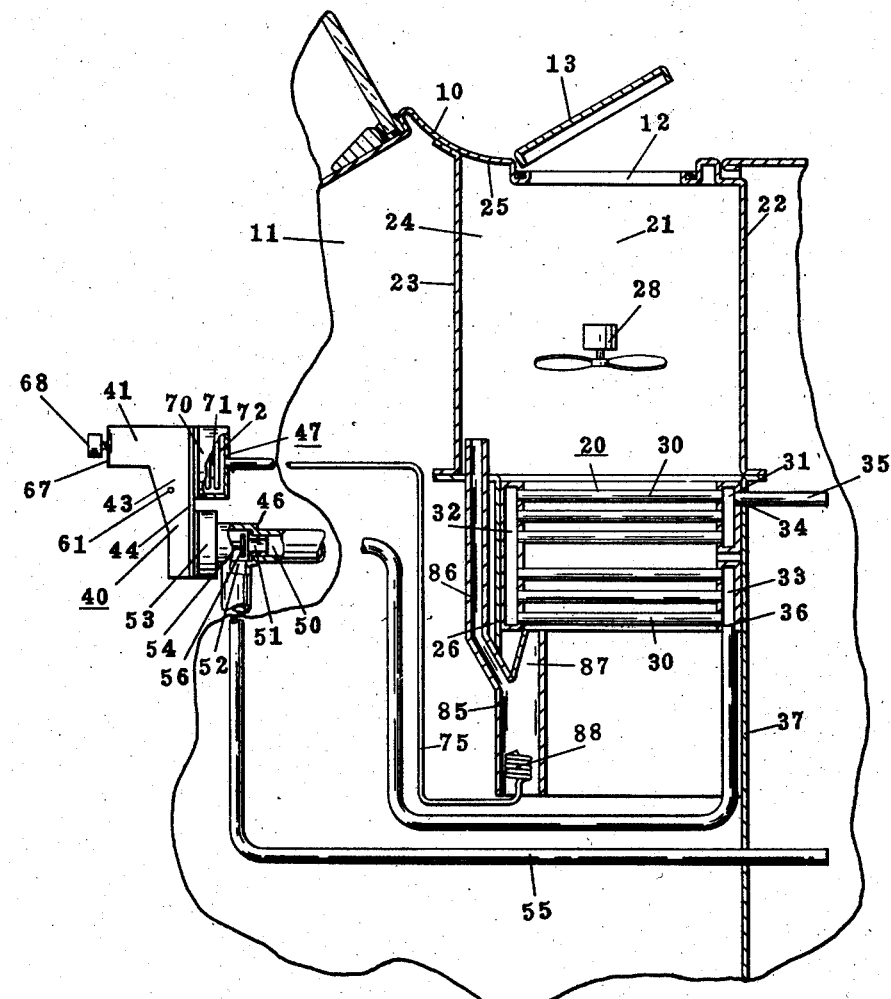

Patented Nov. 11, 1941

2,262,496

UNITED STATES PATENT OFFICE 2,262,496

CONTROL APPARATUS

Walter V. Hobbs and Eldon D. Raney, Columbus, Ohio, assignors to Ranco Incorporated, Columbus, Ohio, a corporation of Ohio Application April 13, 1939, Serial No. 267,719

3 Claims. (Cl. 236—37)

The present invention relates to thermostatic control apparatus and more particularly to apparatus for controlling the air temperature of an enclosure. The subject matter of the present invention is related to the subject matter disclosed in the application of Eldon D. Raney, Serial Number 204,823, filed April 28, 1938, for Control apparatus.

One of the objects of the invention is to provide a control apparatus for a heat exchanger, which apparatus includes a temperature responsive device that is affected by the temperature of air directly from heat exchange relation with the heat exchanger and air unaffected by the heat exchanger so that the control apparatus will control the exchanger in accordance with the temperature of the air that is to be affected by the exchanger.

Another object of the invention is to provide a control for a heat exchanger that is adapted to affect the temperature of the air flowing into an enclosure, which controller has a temperature responsive part thereof positioned in heat transfer relation with the heat exchanger and also in heat transfer relation with the air from the outside of the enclosure unaffected by the heat exchanger.

Other and further objects and advantages will be apparent from the following description, reference being had to the accompanying drawings wherein preferred forms of embodiment of the present invention are clearly shown.

In the drawings:

Fig. 2 is a fragmentary side view of an automobile, partly in section, showing another form of the invention applied to a heating system for a vehicle, and Fig. 3 is a fragmentary side view of the thermostatic system partly in section.

Figure 1:
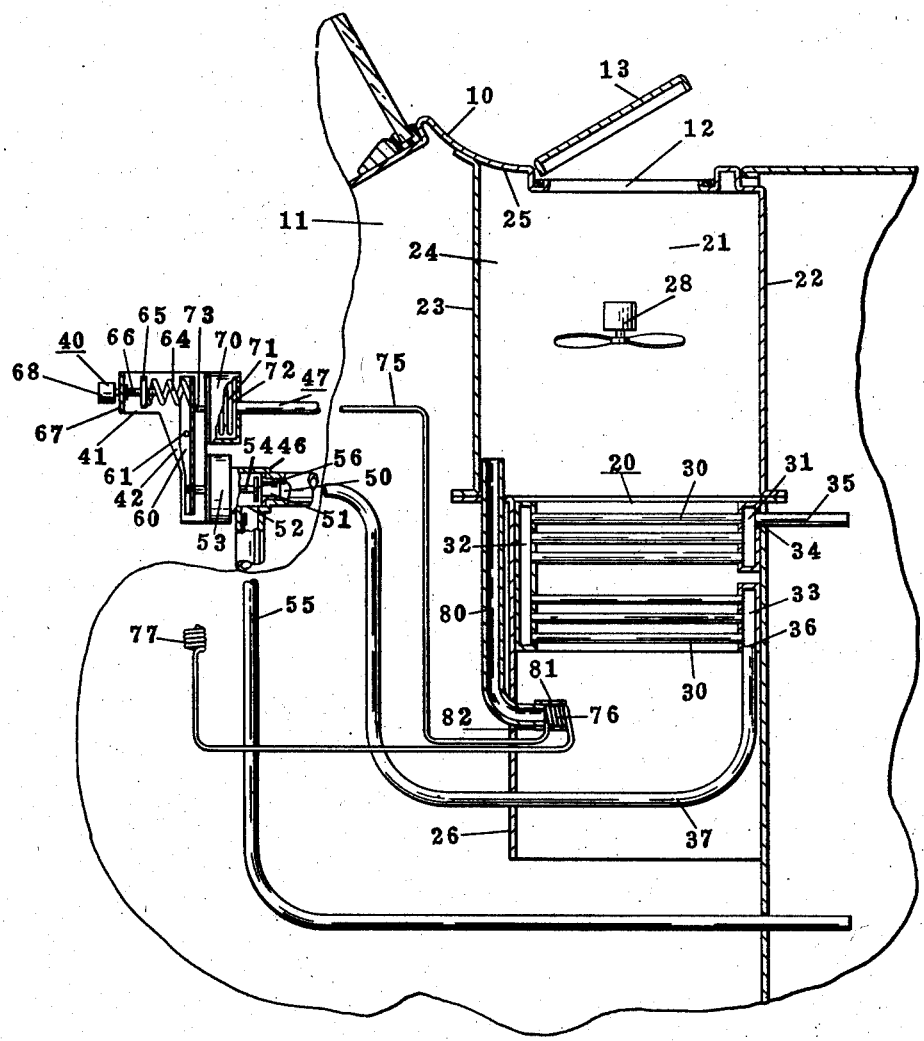
Fig. 1 is a fragmentary side view of an automobile, partly in section, showing one form of the invention applied to the heating system for a vehicle.

Referring to the drawings an automobile 10, having an enclosed passenger compartment 11, is provided with an opening 12 at the front of the compartment. The opening 12 is adapted to be closed by a cover 13 that is mounted on suitable well known mechanism (not shown) that permits the cover 13 to be tilted to an open position, as illustrated in the drawings, by the operator of the automobile. When the cover is in the open position and the automobile is in motion, air will be deflected by the cover into the interior of the passenger compartment through the opening 12. The incoming air creates a pressure inside the compartment causing the air to leak outwardly through openings and crevices therein, and this fresh air entirely fills the compartment.

It is desirable to condition the air entering the compartment 11, so that the temperature thereof will be comfortable to the passengers in the automobile. The present invention provides means for conditioning the incoming air to maintain the interior of the compartment at a substantially uniform, comfortable temperature regardless of the changes in temperature of the outside air below the temperature desired to be maintained inside the automobile. In carrying out the invention a heat exchanger 20 is mounted in an inlet duct 21 that is connected with the opening 12. The duct 21 is formed by a front wall 22 of the compartment 11, a confronting wall 23 and two side walls 24 (only one appearing in the drawings). The walls 23 and 24 are attached to the top wall 25 of the compartment and extend downwardly somewhat below the bottom of the exchanger 20, but terminate a substantial distance from the floor of the compartment to allow room for the legs of the persons riding in the front seat of the automobile. The wall 23 is provided with an offset section 26 to which one side of the exchanger 20 is attached. An electric powered fan 28, connected with the battery of the automobile, is mounted in the duct and operates to direct air through the exchanger when the automobile is stationary.

The exchanger 20 may be of any suitable construction, but in the present embodiment, the exchanger comprises a plurality of metal tubes 30 positioned crosswise of the duct 21 and which interconnects headers at either end thereof. The tubes 30 are arranged in a series of horizontal planes and spaced from one another to permit passage of air therebetween. Preferably tubes in different planes are staggered with respect to tubes in an adjacent plane so that substantially all of the air forced through the exchanger will strike some of the tubes.

One end of the tubes 30 in the upper section of the exchanger 20 are connected to a header 31 and the other ends thereof are connected to a common header 32. The tubes 30 in the lower section of the exchanger are connected at one end of the common header 32 and the other ends thereof are connected to a header 33. The headers 31 and 33 are suitably attached to the front wall 22 and side walls 24, and the header 32 is attached to the walls 23 and 24. The header 31 is provided with an inlet 34 for receiving heated cooling medium from the water jacket of the automobile engine (not shown) through a tube 35. The header 33 is provided with an outlet 36 for discharging the heating medium after it has passed through the exchanger. A tube 37 connects the outlet 36 with a controller valve 40 that controls the flow of the medium through the exchanger. Thus heated liquid from the engine cooling system enters the header 31, flows through the tubes 30 in the upper section of the exchanger to the header 32 and then through the lower tubes 30 to the header 33 and the tube 37 to the controller valve 40.

The controller valve 40 includes a U shaped frame 41 having side walls 42 and 43 of triangular configuration. The side walls 42 and 43 are provided with outturned flanges 44 to which a valve casing 46 and a thermostatic system 47 are attached. The valve casing 46 is formed with an inlet 50, a valve seat 51, an outlet 52 and a base 53 that is attached to the frame. The tube 37 is connected to the inlet 50 and a tube 55 connects the outlet 52 with the water pump for the engine cooling system. A valve stem 54 extends into the valve casing and a suitable hermetic seal is provided between the stem and casing to prevent leakage of liquid around the stem. A valve plate 56 is attached to one end of the stem, and is adapted to close the valve seat 51. The outer end of the stem 54 is attached to a channel shaped lever 60 pivoted between the walls of the frame by a pin 61. The lever 60 is rocked about the pin 61 to open and close the valve by a compression spring 64 and the thermostatic system 47. The spring 64 is compressed between the lever 60 and a plate 65 and biases the lever 60 clockwise to open the valve. The plate 65 is threaded on a screw 66 rotatably mounted on the yoke 67 of the frame 41 and abuts the side walls of the frame to prevent rotation thereof so that the plate will be moved along the screw 66 when the screw is rotated. A knob 68 is attached at one end of the screw whereby the tension of the spring 64 may be adjusted by the operator of the automobile.

The thermostatic system 47 comprises a casing 70 having one end thereof closed by a bellows 71, and a tube 75, closed at one end, connected with the enclosure formed by the bellows and casing. The casing is suitably attached to the flanges 44 of the frame 41. The bellows 71 has one end open, and is closed at the other end by a wall 72. The edges at the open end of the bellows are hermetically joined to the walls of the casing as by solder. A pin 73 connects the end wall 72 with the lever 60. When the bellows 71 is collapsed by pressure within the casing 70, the lever 60 will be moved counterclockwise to close the valve, and when the pressure within the casing is lowered, the spring 64 reacts against the lever 60 rotating it clockwise against the bellows to open the valve. The casing and the tube contain a volatile fluid, for example, methyl chloride or sulphur dioxide, the amount of fluid being such that the fluid will be completely vaporized at 90 deg. F. and below that temperature liquid fluid will be present in the system. The spring 64 is normally adjusted to commence to open the valve when the pressure in the thermostatic system 47 falls to a point corresponding to the vapor pressure of the fluid in the system at 70 deg. F. Thus the valve will open if any part of the system 47 is at 70 deg. F. or less. The amount of liquid in the system at temperatures below 70 deg. F. may be retained in a relatively short section of the tube 75 by capillary attraction. Sections of the tube may be coiled to provide a condenser portion thereof that may be placed in an area, the temperature of which is to be a function of the valve.

Preferably the controller valve 40 is attached to the dash board of the automobile so that the knob 68 may be accessible for adjustment of the valve.

Referring to Fig. 1, an air by-pass tube 80 extends along the outside of the air duct 21, its upper end extending into the duct above the exchanger 20 and its lower end turned and extending through an opening in the wall 26 into the duct below the air discharge of the exchanger. The thermostatic tube 75 extends into the duct 21 through suitable openings in the wall 26.

The tube 75 is coiled at 76 and the coil is fitted inside a collar 81, preferably formed of a heat conducting material, mounted on the end of the tube 80. The collar 81 is slotted at 82 to accommodate the thermostatic tube 75. Thus the outer surface of the coil 76 is subjected to heat of the air emanating from the heater and the inside of the coil will be cooled by air from the outside of the automobile compartment not affected by the exchanger.

A coil 77 is formed on the end of the thermostatic tube and this coil is located in the automobile compartment at a position where it will be responsive to a representative average temperature of the air in the compartment and where it will be colder than the other parts of the thermostatic system, except the coil 76, and at times may be colder than the coil 76.

Assuming that the controller 40 is adjusted to maintain a temperature of 70 deg. F. and that the temperature of the compartment and atmosphere are considerably below 70 deg. F., when the fan 28 is operating or the automobile is moving, and the cover 13 is open, air is directed from outside the automobile into the duct 21, through the exchanger 20 and out the lower end of the duct into the compartment 11. The fluid in the thermostatic system 47 will be partly liquid and the pressure in the system will be relatively low so that the valve 40 will be opened by the spring 64. Hot liquid from the engine will then flow through the exchanger and impart heat to the air passing therethrough. Heated air emanating from the exchanger strikes the collar 81 and tends to warm the coil 76. Air from the outside, unaffected by the exchanger, passes through the tube 80 and tends to cool the inside of the coil 76 so that the temperature of the fluid in the coil 76 will be between the temperature of the unheated air and the heated air. Thus the outside air tends to lower the temperature of the coil 76. When the temperature of one of the coils rises while the other coil is below 70 deg. F., the valve will be controlled by the cooler of the coils since the liquid in the system will condense in that coil. For example, if the temperature of the coil 76 is raised above 70 deg. F. but the temperature of coil 77 is below 70 deg. F., the valve will not be closed until the temperature of the coil 77 is raised to or above 70 deg. F. The valve is closed by increasing pressure in the thermostatic system caused by the vaporization of the liquid fluid. The valve will be moved toward open wide position when either one of the coils 76 or 77 falls below 70 deg. F.

The introduction of unheated air in heat transfer relation with the coil 76 will cause the coil to be more readily cooled when the atmospheric temperature is relatively low. This insures that there will always be a warm flow of air through the heater to prevent chilling drafts of air over the persons seated in the front of the automobile body. Also the heater will be caused to operate at higher temperatures in response to decreases in the atmospheric temperature thus automatically compensating for the increased heat losses that will occur through the body of the automobile.

The valve 46 may be controlled solely according to the temperature of the coil 76 by omitting the coil 77 and the portion of the tube 75 connecting the coils.

Referring to Fig. 2, another arrangement for controlling the operation of the thermostatic system is shown. In this embodiment of the invention, a tube 85 is provided having two branching sections 86 and 87. The section 86 extends outside the duct wall 26 and upwardly into the upper part of the duct 21 above the exchanger. The section 87 extends upwardly, terminating adjacent the air outlet of the exchanger. The end of the thermostatic tube is coiled at 88 and is disposed in the tube 85 adjacent the outlet thereof. Thus a mixture of heated and unheated air will strike the coil 88 to affect the temperature of the coil. It is apparent that the unheated air mixing with the heated air in the tube 85 will lower the temperature of the latter air to cause operation of the controller valve similar to the form of embodiment described with reference to Fig. 1.

If it is desired, the control system may be made to control the valve similarly to the form of embodiment described with reference to Fig. 1 by providing a lengthier tube 75 and forming a second coil at the end thereof and disposing that coil in the automobile passenger compartment.

While the forms of embodiments of the present invention as herein disclosed constitute preferred forms, it is to be understood that other forms might be adopted, all coming within the scope of the claims which follow.

We claim:

1. In combination, means forming an inclosure for air; a heat interchanger associated with the inclosure; means for directing air over the interchanger for affecting the temperature in the inclosure; means operable for attaining a desired temperature of air within the inclosure and operable after said desired temperature is attained, for preventing the temperature of the air emanating from the heat interchanger from varying beyond a certain temperature, said last means including a controller for changing the rate of heat exchange between the heat interchanger and the air, and a pressure responsive device for regulating the controller, said pressure responsive device having condensing means connected therewith, said device and condensing means containing a heat responsive fluid, said fluid being partially liquid and partially vapor when the heat exchange system is operating normally, said condensing means having a plurality of condenser portions spaced from one another, the relative amounts of liquid and its vapor being so proportioned that substantially all of said liquid is adapted to be contained in one or the other of said condenser portions whereby the controller is responsive substantially solely to the temperature of the colder condenser portion, one of said condenser portions being disposed to be affected by the temperature of the air in the inclosure remote from the heat interchanger and the other condenser portion being disposed to be more directly affected by the temperature of the air subjected to the heat interchanger; and means for by-passing air around the interchanger and into heat exchange relation with the last mentioned condenser portion.

2. In combination, means forming an inclosure for air; a heater associated with the inclosure; means for directing air over the heater for affecting the temperature in the inclosure; means operable for maintaining at least a predetermined minimum temperature of air within the inclosure and operable, after said predetermined temperature is attained, for preventing the temperature of the air emanating from the heater from falling below a certain temperature, said last means including a controller for changing the rate of heat exchange between the heater and the air, and a pressure responsive device for regulating the controller, said pressure responsive device having condensing means connected therewith, said device and condensing means containing a heat responsive fluid, said fluid being partially liquid and partially vapor when the heat exchange system is operating normally, said condensing means having a plurality of condenser portions spaced from one another, the relative amounts of liquid and its vapor being so proportioned that substantially all of said liquid is adapted to be contained in one or the other of said condenser portions whereby the controller is responsive substantially solely to the temperature of the colder condenser portion, one of said condenser portions being disposed to be affected by the temperature of the air in the inclosure remote from the heater and the other condenser portion being disposed to be more directly affected by the temperature of the air subjected to the heater; and means for by-passing air around the heater and into heat exchange relation with the last mentioned condenser portion.

3. In an automobile vehicle heater of the type in which cold air is taken in from the exterior of the vehicle and passed over a heat exchanger prior to delivery to the space to be heated, comprising means for circulating a heating fluid through the heat exchanger, a plenum chamber in the heater upon the cold air side of the heat exchanger, a bleeder tube extending from said plenum chamber around said exchanger, a valve for controlling the flow of said fluid through the heat exchanger, and a single heat responsive element positioned partially within said bleeder tube and partially within the space to be heated for regulating the degree of opening of said valve.

WALTER V. HOBBS.
ELDON D. RANEY.